(No Model.)
W. CALVER.
APPARATUS FOR MAKING GAS.
No. 549,765. Patented Nov. 12, 1895.
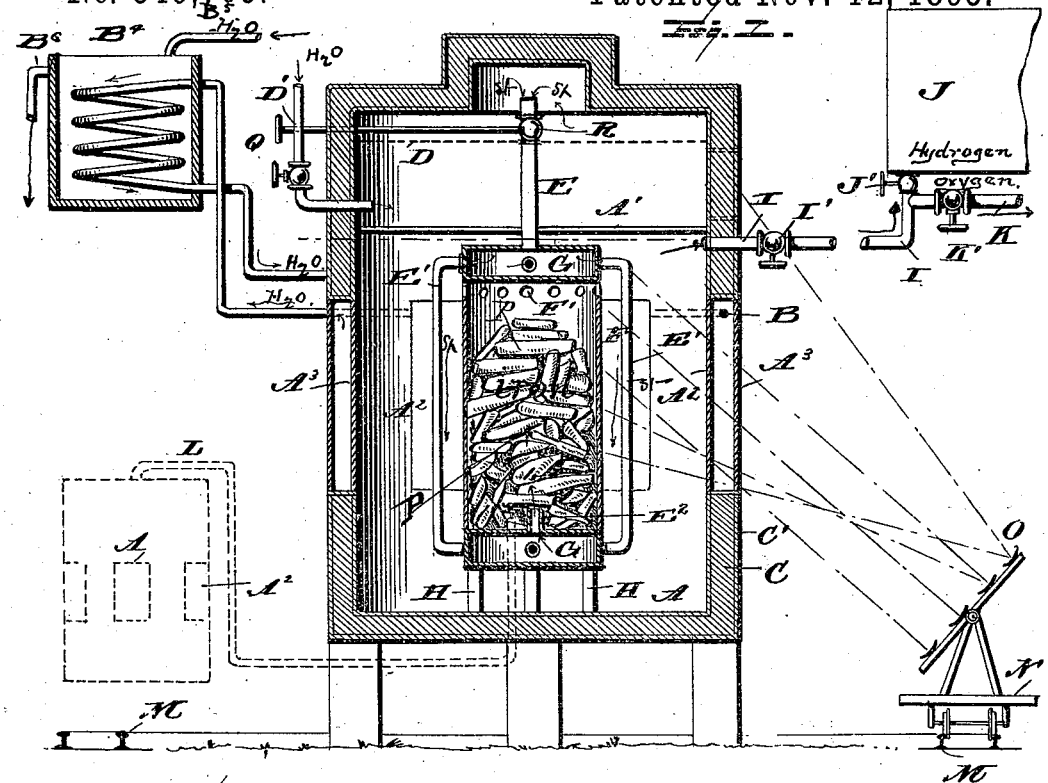
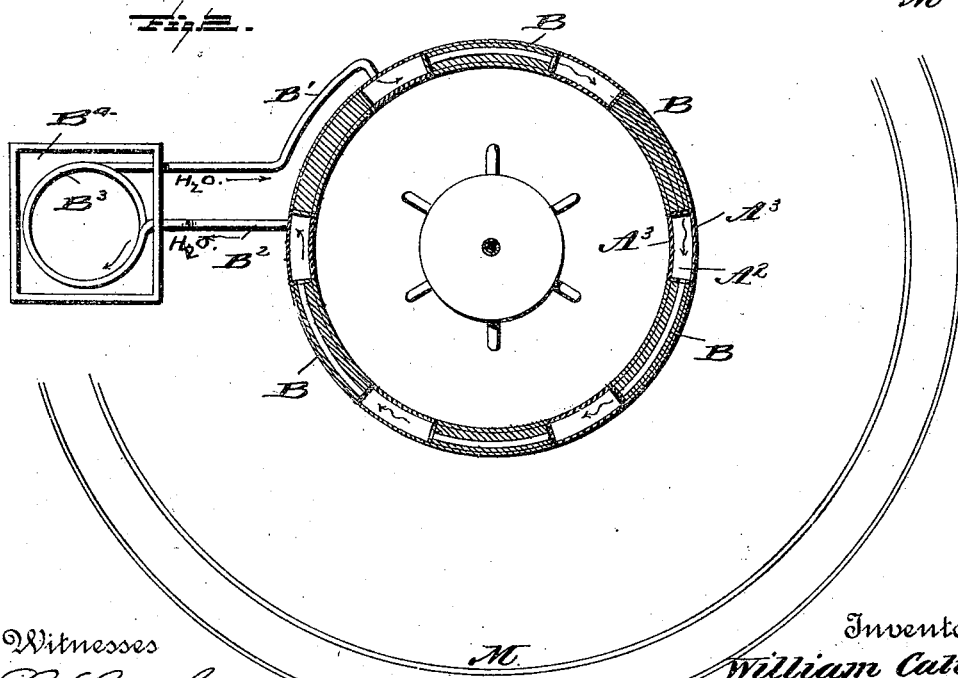
Witnesses
L. C. Mills
Heath Sutherland
Inventor
William Calver
by E. B. Stocking
Attorney

UNITED STATES PATENT OFFICE.

WILLIAM CALVER, OF WASHINGTON, DISTRICT OF COLUMBIA.

APPARATUS FOR MAKING GAS.

SPECIFICATION forming part of Letters Patent No. 549,765, dated November 12, 1895.

Application filed April 12, 1893. Renewed April 12, 1895. Serial No. 545,530. (No model.)

*To all whom it may concern:*

Be it known that I, WILLIAM CALVER, a citizen of the United States, residing at Washington, in the District of Columbia, have invented certain new and useful Improvements in Apparatus for Making Gas, of which the following is a specification, reference being had therein to the accompanying drawings.

This invention has relation to an apparatus for utilizing rays of the sun in the manufacture of gases resulting from the decomposition of water.

Water being composed of only two gases—oxygen and hydrogen—the former being the great promoter of combustion and the latter the best-known fuel, the decomposition of water has been the basis of the production of gas for heating and lighting purposes; but the apparatus required was more or less complex and the fuel employed, principally coal, contaminates the gas produced by the commingling of the products of combustion therewith.

One of the prime objects of my invention is to produce pure oxygen and hydrogen gases, and another object is to produce them by means of a simple method which will require an equally simple apparatus; and a further object is to secure the products of the process or method at a minimum cost.

Other objects and advantages of the invention will hereinafter appear, and the novel features thereof will be specifically defined by the appended claims.

Figure 1 is a substantially central vertical section of one form of apparatus adapted to practice the method of my invention. Fig. 2 is a substantially central horizontal section of the same.

Like letters of reference indicate like parts in both of the views.

A represents a heating-chamber, the upper portion of which is separated from the lower portion by a diaphragm $A'$. The heating-chamber is provided with openings $A^2$ for the passage of heat-rays into the chamber. These openings are closed by glass or other heat-conducting plates $A^3$, spaced from each other, and the spaces between the glasses of the several openings are connected one with the other by a pipe B, while pipes $B'$ $B^2$ communicate with a coil $B^3$, located in an exterior tank $B^4$, provided with a supply-pipe $B^5$ and a discharge-pipe $B^6$. The object of this construction of heat-openings and the communicating pipes and coil is to maintain the circulation of a cooling medium, such as filtered water or any other suitable liquid or other refrigerator, within the heat-openings, and to maintain a comparatively-low temperature of such cooling medium by means of any other suitable like medium, such as cold water, which is conducted by the pipe $B^5$ into the tank $B^4$ and flows therefrom through the pipe $B^6$ continuously. The entire heating-chamber, except at the heat-openings, is covered by a jacket of non-conducting substance C, and may or may not, as desired, be provided with an exterior casing $C'$. Such openings as are not in use may also be temporarily covered or closed by a movable or other shutter. The upper compartment of the heating-chamber constitutes a "steam-boiler," so called, the water-line of which is represented by the dotted line D, and the supply of water thereto being conducted thereto by the pipe $D'$. Instead of a plain steam-producing compartment, as shown, any form of steam-boiler or system of coiled pipe may be used. A steam-pipe E passes through the diaphragm $A'$ and projects into the steam-space of the upper compartment and communicates with a pipe or pipes $E'$, which in turn communicate by a pipe $E^2$ with an interior vessel F, located at any convenient point within the heating-chamber. Any suitable arrangement of pipe connections may be employed, and I have shown one form which exposes a pipe $E'$, or more than one, if desired, to any heat passing through the heat-openings $A^2$. In this form a head G gives communication with a series of pipes $E'$ for the steam passing through the pipes E and $E^2$. These heads and the vessel F are supported in this instance by pillars H of any suitable material. Within the vessel F a desired quantity of iron is placed, and the iron is preferably in comminuted or scrap form. The upper part of the vessel F may have openings $F'$ formed therein, or it may terminate at a short distance from the upper head G, or the vessel may be entirely omitted and a mass of iron may be piled upon the lower head G or upon any other suitable support, the main purpose being that the steam formed in the upper compartment shall be conveyed into the mass of iron, and although it may be at any point thereof still it may be solely at the bottom, as shown.

I represents a pipe communicating with the interior of the heating-chamber and provided with a valve I' and terminating in a tank J.' A branch pipe K, having a valve K', extends to another tank. (Not shown.)

Instead of utilizing the upper portion of the main heating-chamber for the production of steam, I may employ any ordinary steam-producing apparatus arranged exteriorly or a steam-producing apparatus having heat-openings $A^2$ similar to those shown and described with reference to Fig. 1, in either case provision being made for the conduction of the steam to the iron of the heating-chamber—for example, by the pipe L shown in dotted lines.

The heating-chamber is arranged concentric with a curved track M, on which a car N is mounted, and upon the car a series of reflectors O for reflecting the solar rays through the openings $A^2$ into the main heating-chamber. This portion of the apparatus may be such as is disclosed in my Patent No. 260,657, dated July 4, 1882, and therefore requires no particular description.

It is well known that iron at a red heat decomposes water rapidly, the oxygen of the steam combining with the iron when at a red heat to a greater extent than when the iron is hotter or colder. I deem it proper to state at this point that although I have designated iron as the material through which to pass the steam any other suitable material for decomposing the steam may be substituted. The oxygen of the steam combining with the iron, the hydrogen is set free and is conducted by the pipe I into the tank J, which may be a gas-holder of any ordinary construction.

When the iron or other substance P becomes oxidized, the steam is shut off by any suitable means—for example, by the hand-wheel Q, communicating with a valve R on the steam-pipe E—and the substance P is heated by means of the reflectors acting directly thereon to such a degree as to expel the oxygen from the substance and the valve J' is closed, the valves I' and K' opened, so that the oxygen may be conducted to a separate tank or gas-holder. (Not shown.) After deoxidation steam is again passed into the substance and hydrogen again produced. As constructed, the steam is superheated in the upper head G and pipes E', although any other form of piping or arrangement for superheating the steam may be employed, if desired. It is apparent that the deoxidation of the substance P might be accomplished by the introduction of carbonic oxide and acid made in a separate coal or wood furnace; but for reasons above stated this is not the preferred manner of accomplishing this result.

While I have shown one form of apparatus for producing oxygen and hydrogen gases free from contamination and noxious ingredients, my invention is not limited to the apparatus shown, as it is apparent that I can separate the steam-producing apparatus from the main heating-chamber. I can employ the latter solely for heating the deoxidizing substance P, or I can combine the steam-producing and the deoxidizing apparatus in one, as shown, or these various arrangements may be modified in numerous particulars and especially in the construction and arrangement of the connecting-pipes and their appurtenances. So, also, instead of introducing steam direct into or onto the deoxidizing substance I may cause water to be forced or ejected onto or into the same, or it may be allowed to run thereonto to generate steam.

It is apparent that the herein-described method or process may be employed in the production of gases or other products from other substances by decomposing the same through the instrumentality of solar rays impinged upon the decomposing material impregnated with the substance to be decomposed, and the invention is therefore not limited to the production of any particular gas or gases.

What I claim as new is—

1. The combination of a closed heating chamber provided with means for supporting a deoxidizing material and for the supply of steam thereto and with closed openings adapted for the passage of heat into the chamber, of an apparatus for directing the solar rays into the chamber through said opening, substantially as specified.

2. A non-conducting shell provided with an inner retort with a steam-supply thereto and means for water circulation to heat confining and diathermanous windows therein, substantially as specified.

3. The combination with the non-conducting shell having diathermanous openings, the inner retort and means for water circulation to said openings, of a steam chamber with pipe connections for filling and for discharging steam into the retort receptacle, substantially as specified.

4. A closed heating chamber provided with means for supporting a deoxidizing material and for the supply of steam thereto and with diathermanous openings adapted for the passage of heat into the chamber, substantially as specified.

5. The combination with the non-conducting shell, the inner retort and means for water circulation and the steam chamber with its pipe connections for filling and for discharging steam into a retort receptacle, of heat confining and diathermanous windows connected with the water circulation, substantially as specified.

6. The combination with the non-conducting shell, the inner retort provided with a steam supply, means for water circulation and diathermanous windows in said shell, of a solar reflector, substantially as specified.

7. The combination with the non-conducting shell, the steam supply inner retort, means for water circulation to diathermanous windows, of a solar reflector movably mounted whereby it may be adjusted with relation to the apertures to reflect solar heat upon the retort, substantially as specified.

8. A closed heating chamber provided with means for supporting a deoxidizing material and for the supply of steam and with diathermanous openings adapted for the passage of heat into the chamber combined with a movably mounted solar reflector, substantially as specified.

9. A solar furnace provided with heat openenings adapted for the circulation of clear water, and a system of piping communicating with said openings and passing through a tank whereby the clear water may be maintained at a desired temperature by an independent body of water, substantially as specified.

In testimony whereof I affix my signature in presence of two witnesses.

WILLIAM CALVER.

Witnesses:
   E. B. STOCKING,
   HEATH SUTHERLAND.